United States Patent Office 3,429,694
Patented Feb. 25, 1969

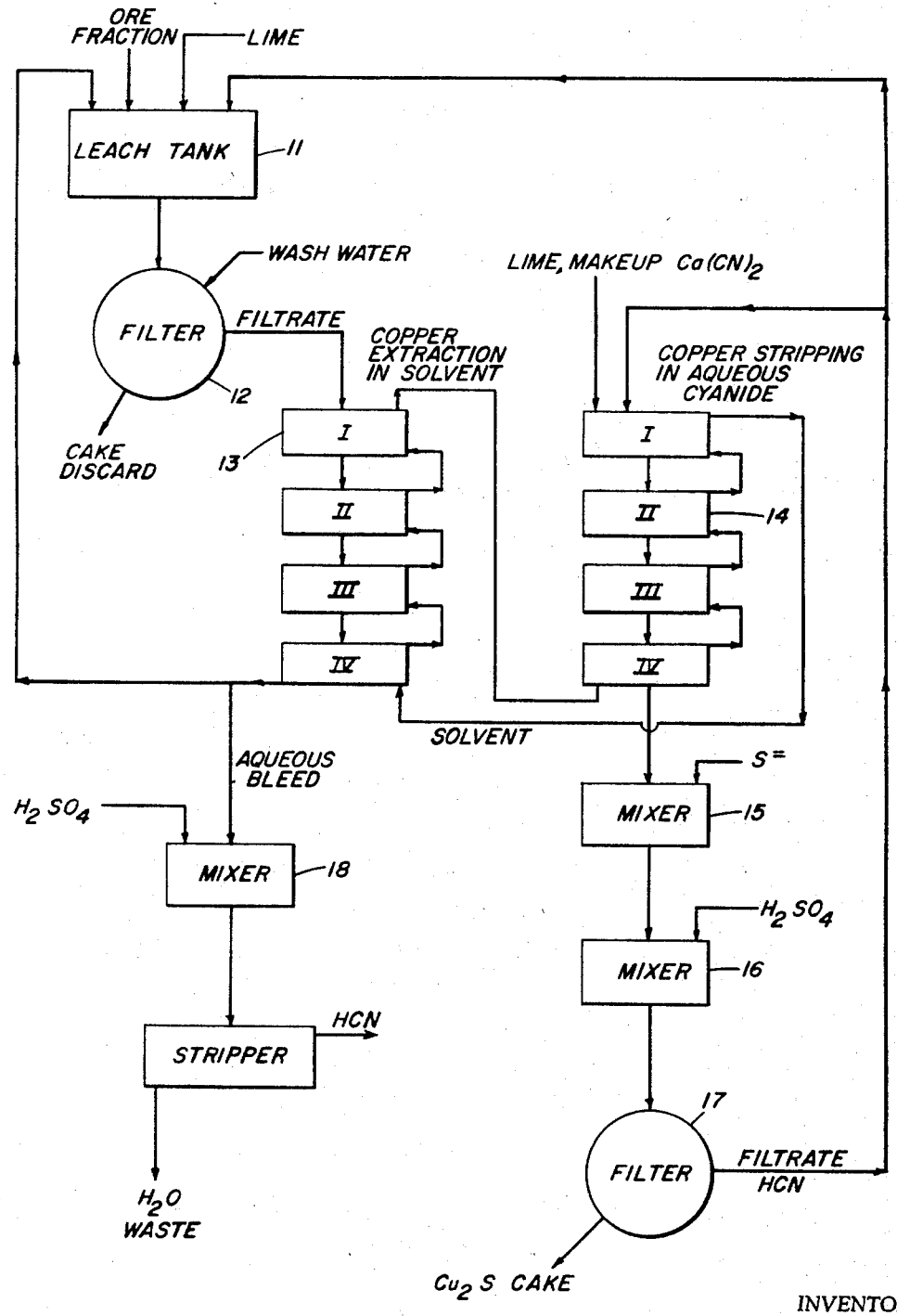

3,429,694
RECOVERY OF COPPER AND CYANIDE
FROM SOLUTIONS THEREOF BY SOLVENT EXTRACTION
George William Lower, Bethel, Conn., assignor to American Cyanamid Company, Stamford, Conn., a corporation of Maine
Filed May 10, 1965, Ser. No. 454,502
U.S. Cl. 75—117        6 Claims
Int. Cl. C22b 15/12, 15/08; C01g 3/12

ABSTRACT OF THE DISCLOSURE

Copper is recovered from ores, or an ore froth flotation fraction, or a slag, by grinding fine enough to expose the copper bearing particles, which may be sulfide, or oxide or mixed, then leaching with an aqueous alkaline cyanide, liquid-liquid extracting the copper cyanide complex from the leach liquor thus formed with a quaternary ammonium salt or a phosphonium salt extractant such as tricaprylmethyl ammonium chloride or trioctylmethyl phosphonium bromide in a water-insoluble solvent which is a petroleum fraction or monocyclic aromatic liquid such as kerosene or benzene, separating the solvent containing the copper complex, liquid-liquid stripping copper from the solvent solution with a concentrated aqueous alkaline cyanide solution, then acidifying and precipitating the copper from said concentrated solution as a sulfide of copper. The extractions may be countercurrent. The extractant, organic solvent, and the cyanide are all recycled.

---

This invention relates to the recovery and recycling of cyanide in processes for the beneficiation of copper-containing ores and ore fractions, including slags, particularly processes in which copper is dissolved in aqueous alkaline cyanide-containing solutions by leaching, and is extracted from the aqueous alkaline cyanide-containing solution with an oil-soluble, water-insoluble quaternary ammonium or phosphonium compound dissolved in a water-insoluble organic solvent, and more particularly in which the raffinate from the extraction is recycled to the ore leaching and the extract is stripped of the copper with more concentrated aqueous cyanide, with recycling of the solvent and recycling of the cyanide.

Cyanide has long been used for the recovery of gold from gold ores, by leaching of the ore. In a gold leach, the presence of oxygen is essential, the leach is for at least about 24 to 48 hours, and copper has been regarded as a cyanicide, that is, cyanide is consumed in the process, resulting in a loss of cyanide, and increasing costs. The recovery of copper by cyanide leaching, in the absence of noble metal values, has not been considered economically feasible.

At present copper sells at about 32 to 34 cents per pound. Sodium cyanide sells at about 18 to 20 cents per pound.

Although copper can be dissolved by cyanide, extraction of copper by cyanide is economically practical only if cyanide losses can be minimized.

It has now been found that copper is selectively dissolved as a cyanide compound, by an aqueous alkaline cyanide-containing solution, and the copper cyanide salt is extracted into a water-immiscible organic solvent phase, such as kerosene or benzene, with an organic quaternary amine, or phosphonium extractant, as set forth in more detail below; after which the copper may be reextracted into a much smaller volume of more concentrated cyanide in a stripping circuit, or otherwise recovered selectively from the extract. Many impurities occurring in the ore body are left behind in the leaching. All the others are left in the aqueous phase in the solvent extraction.

The present method of recovery and recycling cyanide employs more cyanide than would be economically practical, if lost, but enough cyanide is recovered for reuse so that the process renders practical and economical the cyanide leaching of copper ores to extract and recover copper.

Where not otherwise limited by context, the term "ore fraction" is intended to include the ores themselves, as mined, crushed or ground to treatable size, both rich and lean, as well as selected portions such as fines or slimes from any of the grinding operations, before or after flotation, sands, or any sands fractions of any size in which the reduction of ore particles is small enough that an economic fraction of the copper-containing minerals are exposed to action by reagents, cleaner tailings, rougher tailings, rougher concentrates, cleaner concentrates, and slags, including converter slags and reverberatory slags. With slags, grinding or other methods of attrition may be necessary in order that the subdivision be fine enough to permit attack on the individual copper bearing particles by cyanide solution.

The ore fraction may contain both sands and slimes. The slimes are the finely-divided, difficultly-filterable particles, which frequently are difficult to handle because of the large surface to weight ratio. Sands are larger particles, usually from a classification step, frequently using a cyclone, and are more amendable to flotation. Hence, circuits are useful in which the slimes are tested directly with cyanide leaching, and the sands are floated, with part or all of the concentrate sent to the smelter as in conventional processing, and with part of the tailings, or cleaner tails being treated by cyanide leaching. The economics of cyanide leaching of each fraction may be separately considered. The preferred circuit varies with the type of ore treated, the richness of ore, and availability of water, cyanide, sulfide, acid, the organic solvent and the quaternary ammonium or phosphonium extractant. The most economical circuit for a specific ore or ore fraction can be chosen using the principles set forth herein as applied to the conditions that prevail at a specific ore processing operation.

The present process gives good results with sulfide ores, oxide ores and mixed ores.

As used herein, the term "sulfide ores" includes the more common sulfide minerals, such as chalcocite ($Cu_2S$), digenite ($Cu_9S_5$), and covellite ($CuS$), as well as mixed sulfides such as bornite ($Cu_5FeS_4$), enargite ($Cu_3AsS_4$), and tetrahedrite ($Cu_{12}Sb_4S_{13}$).

The term "oxide ores" is used to cover the ores in which the copper occurs as an oxide or carbonate such as azurite ($CuCO_3 \cdot Cu(OH)_2$), malachite

$$(Cu_2(OH)_2CO_3)$$

cuprite ($Cu_2O$), tenorite ($CuO$), and forms of chrysocolla, which is a silicate mineral of copper.

The term "mixed ores" is used to cover ores in which the copper occurs as both sulfied minerals and oxide minerals and the proportion of each is large enough that for reasonably economic recovery both types of copper minerals need to be considered in the metallurgy. Sulfide ores which are completely free from oxide, or oxide ores which are completely free from sulfides are unusual. Ores exist in which the proportion of oxides in a sulfide ore or sulfide in an oxide ore is so low that for metallurgical recovery purposes the ore may be considered as essentially the sulfide or an oxide type. Similarly, in working with slags the same classification can be used and in working with ore fractions the same terminology is applicable.

Fortunately, in the present process, minor modifications in ratios only are required to provide for sulfide, oxide and mixed ores and, in general, any of the ore fractions may be treated rapidly, efficiently and effectively by adjusting the quantity of reagents in accordance with the present invention so that sufficient cyanide is present to dissolve all of the recoverable copper in the particular ore fraction. The copper is predominantly present as a complex anion having a double negative valence, $Cu(CN)_3^=$. Other species having a valence of $-1$ or $-3$ or more also are present.

It is to be understood that in some ores part of the copper is present in inclusions so fine that it is uneconomical to grind the ore fine enough to release all of the copper and such inclusions can be considered as non-recoverable copper.

As is obvious to those skilled in the art, the exact proportions, ratios, and treatments, including the choice of crude calcium cyanide, gaseous hydrogen cyanide, or alkali or alkaline earth cyanide, including ammonium cyanide, or organic $a$-hydroxy cyanides such as lactonitrile, or recycled cyanide or mixtures as the source of cyanide, as well as the grinding, water ratios, and other operating parameters are a function of economics and vary from time to time and mine to mine. In many instances the adequacy of water supply, the problems of waste disposal, the problems of transportation of chemicals to the mine, and the presence of available lime, alkali, or alkaline earth materials, affect the economic picture and, hence, the preferred ratios and usages will vary from those given in the examples, depending on pertinent economic factors.

The present invention is based on the discovery that a copper ore leached with a soluble cyanide to give a soluble cuprocyanide has the cuprocyanide extracted at a favorable rate into an organic phase of a water insoluble organic solvent containing dissolved long chain quaternary amines and/or phosphonium salts.

The use of cyanide solutions to extract copper from ore fractions is described in copending application Ser. No. 418,324, filed Dec. 14, 1964, George William Lower, now U.S. Patent 3,403,020, Sept. 24, 1968, entitled "Leaching of Copper From Ores With Cyanide and Recovery of Copper From Cyanide Solutions."

The extraction of copper cyanides from spent catalyst solutions after synthesis of dicyanobutene is described in U.S. Patent 3,056,648, E. Childers and N. E. West, "Process for Extracting Cyanides," Oct. 2, 1962. The pH, extract ratios, impurities and general field of the invention are such that the disclosures there would not make the present invention obvious. Said patent uses a brine feed. Brine is not here necessary, desirable or economical.

The present invention is particularly advantageous because dilute cyanide solutions can be used to extract copper from low grade ores, and by extraction of the cuprocyanide into a much smaller solvent volume, the copper is concentrated to permit the treating of much smaller volumes of working material in subsequent processing. After the copper is dissolved in the aqueous cyanide leach solution, preferably but not necessarily, solids are removed by filtration or decantation, or both. Conveniently the ore is split into sands and slimes. Sands, if treated by the present process, filter and settle comparatively rapidly. Hence, the aqueous cyanide solution can be easily separated from the sands. Additionally, if the sands are free from slimes the extraction into the organic phase may occur in the presence of the sands. When extracting slimes, the finely-divided residual gangue tends to cause emulsification of the organic solvent in the aqueous phase and complicates phase separation unless the slimes are removed before extraction. Hence, with ore materials containing fines, filtration or decantation is advantageous and with sands it is very convenient and rapid so that the quantity of material being extracted is reduced. Usually the aqueous cuprocyanide solution is comparatively free from solids before treating to extract the cuprocyanide.

The organic phase for the extraction must be water insoluble and preferably very insoluble to reduce losses. The solubility in water at 25° C. should be below about 0.1%, and preferably below 100 parts per million to reduce losses in the aqueous copper cyanide phase being extracted. A fraction more soluble may be used if available at a price that makes losses acceptable. The specific gravity needs to be different from the aqueous phase to permit fast phase splitting. Theoretically a fraction heavier than water can be used, but economically present prices dictate solvents lighter than water. A specific gravity of less than 0.9 is preferred for fast separation; about 0.8 gives even faster separation. The organic phase should be a liquid at the temperature of operations and for economic operations must be very low in cost. Theoretically, liquid aliphatic hydrocarbons, pure or mixed, including cycloaliphatic hydrocarbons and aromatic hydrocarbons, including arylalkyls are satisfactory. Chlorinated or other halogenated comparable solvents may be present in the solvent. From cost considerations aliphatic fractions from petroleum distillation, such as kerosene, are most advantageous. Monocyclic aromatic fractions, such as benzene, mixed xylenes, and toluene petroleum fractions containing some proportions thereof are sometimes available at a price which is competitive. If more volatile than kerosene, the inflammability and loss by volatilization becomes high and if much higher than the kerosene range, the viscosity becomes high and, hence, disadvantageous. Similarly, among the aromatics, aromatic fractions from petroleum distillation, including benzene, toluene, xylene, and mixtures thereof, are economically advantageous. Some of these materials are available under such trade names as Varsol, Solvesso, etc. Pure materials give excellent results—the choice is usually the cheapest available organic solvent, usually a mixture and not particularly pure. Frequently a petroleum fraction of mixed aliphatic and aromatic compounds is the most economical. A solvent of low viscosity is preferred but not essential. Fortunately, the petroleum fractions of low price are satisfactory in this respect. A solvent of low flammability is preferred to avoid fire hazards. Kerosene has a flash point of about 150° F. to 180° F. Kerosene has a boiling point high enough to keep evaporation losses within reasonable limits. The aromatic petroleum fractions in the same boiling point range are versatile and useful when available at a competitive price.

As extractants commercial grade quaternaries are chosen which are available at a competitive price. Such materials as tricaprylmethyl ammonium chloride, triisooctylmethyl ammonium chloride, tetraheptyl ammonium chloride, tetrahexyl ammonium chloride, trioctylethyl ammonium chloride, and diethyldihexyl ammonium chloride and corresponding hydroxides, iodides, bromides, or fluorides, are all useful. At the pH required to permit extraction without hazardous HCN concentrations being released, the hydroxides act as do the salts, and are classed therewith. A pH of at least 10 is preferred to reduce cyanide volatility.

The compounds are of the formula $R_1R_2R_3R_4N^+X^-$, where X is chloride, bromide, iodide, fluoride, hydroxyl, sulfate, acetate, or other soluble negative ion. Most other salts are higher in price. Lower priced salts have an economic advantage. The R groups are such that the quaternary extractant salt is comparatively water-insoluble and oil-soluble, and does not result in stable emulsion formation. The R groups, individually, may be straight chain, branched chain, saturated or unsaturated alkyl, aryl, cycloalkyl or aralkyl. Usually straight chain compounds are cheaper and more readily available. Inert substituents such as the halogens, which do not influence water or oil solubility may be present, but usually add to the cost. The total carbons in $R_1+R_2+R_3+R_4$ needs to be at least about 18 to avoid excessive losses in the aqueous phase. If any R has more than about 12 carbons, aliphatic, aromatic or mixed, the quaternary salt tends to act as an emulsifying agent and lengthens the breaking time of the agitated mixture of aqueous copper leach solution and the organic solvent. Higher alcohols, such as capryl alcohol or other emulsion breaking agents can raise the carbon limit in the R groups. About 1 to 5% of a $C_8$ and above alcohol aids in rapid phase separation. Hence, preferably no R has more than about 12 carbon atoms. As such, the extractant either alone or carrying copper as a cyanide is highly preferentially soluble in the organic solvent phase, and losses of both the extractant and the solvent are minimized. With higher molecular weight quaternaries, the higher molecular weight requires a higher consumption as the same number of equivalents of the quaternary ammonium compound weighs more in pounds. Because of cost considerations the usual quaternary ammonium compound is the chloride.

The organic extractant and its complexes must be soluble in the organic carrier solvent. The water solubility of the organic extractant and its complexes should be less than about 50 parts per million and preferably less than about 10 parts per million.

The organic extractant should be non-emulsion forming so as to allow rapid and clear phase separation of the organic layer from the aqueous layer. Phase separation times of less than 5 minutes are desirable but under certain conditions longer times may be tolerated depending on local conditions, including tonnage throughput and the nature and size of extracting equipment available.

Also useful as extractants are the phosphonium compounds such as triisooctylmethyl phosphonium bromide and tributyldodecyl phosphonium bromide, diethylhexyldodecyl phosphonium chloride and tributyloctyl phosphonium chloride. Some of the lower molecular weight phosphonium compounds are more soluble than the analogous quaternary ammonium compound, thus allowing the use of less weight of phosphonium compound for an equivalent molar content of extractant.

The phosphonium compounds are often less odorous than are the quaternary ammonium compounds. Commercial grades of quaternary ammonium compounds often have small but extremely odoriferous quantities of lower amines present. Hence, where commercially available at a competitive price, the phosphonium compounds have advantages in being less odoriferous. Phosphonium compounds are flame retardants. Hence, the use of phosphonium compounds somewhat reduce fire hazards, depending on the solvent selected and other considerations. The phosphonium compounds are of the general formula

$$R_1R_2R_3R_4P^+X^-$$

They may be made from phosphine or phosphorous pentachloride. The size and type of R groups is the same as for quaternary ammonium compounds, as is the X.

For extraction from the aqueous cuprocyanide, a solvent phase of 1/10 to 1/4 by weight of the aqueous phase gives good results using a multistage countercurrent extraction system. The amount of the quaternary ammonium chloride or phosphonium halide should be at least in excess of the stoichiometric proportions of the cuprocyanide. By using countercurrent extraction the final extraction may have nearly the theoretical quantity of cuprocyanide ammonium or phosphonium complex dissolved therein, permitting an extremely efficient extraction. The actual ratio in each stage may be more nearly 1 to 4, but a total solvent phase of about 1/10 to 1/4 is preferred to reduce volumes of the solvent being handled.

The initial ore leaching can be at a fairly high solids, in the neighborhood of from 25 to 65% solids, based on the weight of the aqueous leach liquor, and after separation of the solid phase a water wash is used to wash out any of the leach liquor absorbed on the mineral particles. The washings accompany the leach liquor into the extraction step. The washed leached cake is discarded. The leach liquor after extraction is conveniently recycled to the leaching operation, with the addition of such quantities of cyanide as may be required. At least part of the cyanide is preferably recycled from the latter recovery step.

Because of the wash water a bleed is necessary to prevent undue accumulation of liquids and the bleed liquid can be acidified with an inexpensive acid, such as sulfuric acid, and residual cyanide stripped therefrom as HCN, which is recovered for reuse. The water is discarded.

The solvent extract containing the organic solvent solution of the quaternary ammonium or phosphonium complex with cuprocyanide is then passed to a second or copper stripping column where a smaller quantity of a comparatively concentrated aqueous cyanide is used to strip the cuprocyanide from the solvent. A concentrated, at least one molar solution, of calcium cyanide or sodium cyanide in a countercurrent stripping column in a plurality of stages strips 99% of the copper. The stripped solvent containing the regenerated quaternary ammonium compound or phosphonium compound is then recycled to extract more copper from the leach liquor. The stripping solution can conveniently have a volume of less than 10% and frequently in the neighborhood of only a few percent of the original leach solution. Additionally, the solvent extraction is selective so that copper, together with most of the gold and silver, and with comparatively smaller quantities of other materials are then present. Some zinc remains with the copper but only minor quantities of lead or iron remain as impurities.

The copper is then recovered from this rich, comparatively pure copper cuprocyanide solution.

The recovery may be by an electrolytic process, such as described in a copending appliaction of George William Lower, Ser. No. 443,800, filed Mar. 30, 1965, entitled "Electrolytic Recovery of Copper From Copper Cyanide Leaching Solutions." It also is conveniently recovered by adding a stoichiometric quantity of sulfide ions, such as in the form of sodium hydrosulfide and then acidifying with an inexpensive acid, such as sulfuric acid, to yield a comparatively pure cuprosulfide precipitate which is conveniently separated out as a cuprous sulfide cake for smelting or other treatment. The filtrate which is comparatively rich in HCN is made alkaline by the addition of lime and used as the source of cyanide for either or both the original leaching operation and the copper stripping operation. Conveniently, the recovered cyanide is fed to the leach tank and makeup cyanide is fed to the stripping column as required, in addition to recycled cyanide, to make up for losses. Other proportions may be used—i.e. the makeup cyanide can be added to either circuit or both.

In the interest of safety, the original leaching and subsequent operations and the stripping of the organic solvent is accomplished at a pH of at least 10 and preferably in the range of 11 to 12. Lime can be used to insure a high alkalinity, and a reserve alkalinity, which thus reduces the likelihood of the escape of cyanide fumes to the atmosphere. As cyanide is highly toxic, it is necessary that adequate ventilation be used and precautions taken to insure that concentration in air is below 10 parts per million of cyanide in any area where operators may be working.

A flow sheet showing the flow of the components is presented in the accompanying drawing.

Specific examples of operation within the scope of this invention follow.

It is to be understood that the exact proportions, the points at which bleeds or recoveries are secured, and the exact concentrations may vary from those shown in the examples, which are exemplary only as the scope of the invention is set forth in the appended claims. It is further noted that the most economically advantageous operations for any one particular ore are not necessarily those most advantageous for a different ore or a different economic area, where labor and raw material prices are different.

Example 1

A chalcocite ore (containing about 6 pounds of copper per ton, predominately $Cu_2S$) was leached in a leach tank 11 with aqueous sodium cyanide at a molar ratio of NaCN:Cu of 3:1 for 1 hour at 50% solids without pH adjustment at the natural pH of about 11.5. The ore residue was separated in a drum filter 12 by filtration, washed and the wash combined with the pregnant solution. Copper extraction was 88.4% and the pregnant solution of combined filtrate and washing contained 2.5 g. Cu/liter. The cake was discarded.

The copper was extracted in a 4 stage countercurrent extractor 13 from the pregnant solution by contacting with an organic phase consisting of 177 grams (132 grams real) of a quaternary amine, a commercial product which was largely tricaprylmethyl ammonium chloride, plus 50 milliliters of capryl alcohol to 1 liter of kerosene in four successive countercurrent stages at a phase ratio in each of 1:4. The phase ratio is the weight ratio of solvent phase to aqueous phase. Copper recovery from the pregnant into the organic phase was over 99.9%. Copper concentration in the organic phase was 10.2 g./liter. The raffinate (aqueous phase following extraction) was recycled to the ore leaching circuit.

The copper cyanide complex was stripped from the organic phase in four stages in a four stage stripping column 14 using aqueous 2.0 molar NaCN at a phase ratio of 4:1. Copper concentration in the final strip solution was 40.2 g./liter.

Both extraction and stripping were run countercurrently. The stripped organic phase was recycled to the solvent extraction circuit.

The concentrated aqueous stripping solution was treated with 0.45 lb. NaHS per pound of contained copper, in a first mixer 15, acidified with $H_2SO_4$ to pH 3 to precipitate a copper sulfide cake, in a second mixer 16, which was filtered out in a cake filter 17 and the filtrate was recycled to the stripping circuit, with a bleed to the leach circuit, to prevent volume build-up, and cyanide build-up.

Overall cyanide recovery was 90% and copper recovery from the pregnant solution was 98%.

A small portion of the raffinate was removed before recycle to compensate for the wash water used during filtration of the leach residue. This solution was separately treated with acid in a third mixer 18 and steam stripped to recover HCN, in a column 19.

A similar example is conduced using commercial crude calcium cyanide, at an equivalent $CN^-$ level. Similar results are obtained.

Example 2

A copper flotation tailing (primarily chalococite) containing 0.5% copper was leached in a leach tank with aqueous crude calcium cyanide at a molar ratio of NaCN equivalent:Cu of 3:1 for one-half hour at 50% solids at the natural pH of about 11.9. The leach residue was separated in a drum filter by filtration, washed and the wash combined with the pregnant solution. Copper extraction was 89.1% and the pregnant solution of comibned filtrate and washing contained 3.1 g. Cu/liter.

The copper was extracted in a four stage countercurrent extraction from the pregnant solution by contacting with an organic phase consisting of 180 parts by weight (135 parts real) of a quaternary amine per liter, a commercial product which was largely tricaprylmethyl ammonium chloride, plus 50 milliliters of capryl alcohol to 1 liter of kerosene in successive countercurrent stages at a phase ratio in each of 1:4. Copper recovery from the pregnant into the organic phase was over 99.9%. Copper concentration in the organic phase was 12.4 g./liter. The raffinate (aqueous phase) was recycled to the ore leaching circuit.

The copper cyanide complex was stripped from the organic phase in four stages in a four stage stripping column using aqueous 1.0 molar crude calcium cyanide at a phase ratio of 4:1. Copper concentration in the final strip solution was 49.5 g./liter.

In similar examples, using a commercial tricaprylmethyl ammonium chloride, 75% real, the following extraction concentrations in kerosene, from a 2.5 g./liter copper pregnant phase are obtained.

| Grams quaternary per liter kerosene: | Grams copper per liter in solvent |
|---|---|
| 4.4 | 3.3 |
| 8.8 | 7.0 |
| 13.2 | 10.2 |
| 17.6 | 13.0 |
| 26.4 | 19.1 |

Similar runs made with triisooctylmethyl ammonium iodide, tetraheptyl ammonium chloride, tetrahexyl ammonium chloride, trioctylethyl ammonium chloride, dihexyldiethyl ammonium chloride, trioctylmethyl phosphonium bromide, tributyldodecyl phosphonium bromide, diethylhexyldodecyl phosphonium bromide, and tributyloctyl phosphonium chloride give comparable recoveries.

All ratios are by weight, unless otherwise specified, in both the description and claims.

I claim:

1. In the processing of copper ore for the recovery of copper, the step comprising selectively recovering copper as a copper cyanide anion from aqueous alkaline cyanide leach liquors containing ore body impurities which comprises: intimately mixing with an aqueous alkaline leach liquor containing copper cyanide anions and ore body impurities a water-insoluble, oil-soluble extractant selected from the group consisting of quaternary ammonium salts and phosphonium salts having 4 carbon chain substituents per molecule, with each substituent having not greater than 12 carbon atoms and the sum of the number of carbon atoms of the 4 substituents being at least 18, dissolved in a water-immiscible organic solvent selected from the group consisting of petroleum fractions and monocyclic aromatic fractions and mixtures thereof, extracting the copper as a cyanide complex into the said solvent, and separating the solvent phase containing the copper cyanide anion.

2. A process of recovering copper from aqueous alkaline cyanide leach liquors containing ore body impurities which comprises: intimately mixing with an aqueous alkaline leach liquor containing ore body impurities and copper cyanide anions, at least some of which have a double negative valence, a water-insoluble, oil-soluble extractant selected from the group consisting of quarternary ammonium salts and phosphonium salts having 4 carbon chain substituents per molecule, with each substituent having not greater than 12 carbon atoms and the sum of the number of carbon atoms of the 4 substituents being at least 18, dissolved in a water-immiscible organic solvent selected from the group consisting of petroleum fractions and monocyclic aromatic fractions and mixtures thereof, extracting the copper as a cyanide complex into the said solvent, separating the solvent, stripping the copper from said solvent with an aqueous alkaline cyanide stripping solution and recovering the copper from said stripping solution.

3. A process of recovering copper from aqueous alkaline cyanide leach liquids containing ore body impurities which comprises: intimately mixing with an aqueous alkaline leach liquor containing ore body impurities and copper cyanide anions, at least some of which have a double negative valence, a water-insoluble, oil-soluble extractant selected from the group consisting of quaternary ammonium salts and phosphonium salts having 4 carbon chain substituents per molecule, with each substituent having not greater than 12 carbon atoms and the sum of the number of carbon atoms of the 4 substituents being at least 18, dissolved in a water-immiscible organic solvent selected from the group consisting of petroleum fractions and monocyclic aromatic fractions and mixtures thereof, extracting the copper as a cyanide complex into the said solvent, separating the solvent, stripping the copper from said solvent with an aqueous alkaline cyanide stripping solution and precipitating the copper from said stripping solution as a sulfide of copper.

4. A process of recovering copper from aqueous alkaline cyanide leach liquors containing ore body impurities which comprises: intimately mixing with an aqueous alkaline leach liquor containing ore body impurities and copper cyanide anions, at least some of which have a double negative valence, a water-insoluble, oil-soluble extractant selected from the group consisting of quaternary ammonium salts and phosphonium salts having 4 carbon chain substituents per molecule, with each substituent having not greater than 12 carbon atoms and the sum of the number of carbon atoms of the 4 substituents being at least 18, dissolved in a water-immiscible organic solvent selected from the group consisting of petroleum fractions and monocyclic aromatic fractions and mixtures thereof, extracting the copper as a cyanide complex into the said solvent, separating the solvent, stripping the copper from said solvent with an aqueous alkaline metal cyanide stripping solution, recycling the stripped solvent to the extracting step, and recovering the copper from said stripping solution.

5. A process of recovering copper from aqueous alkaline cyanide leach liquors containing ore body impurities which comprises: intimately mixing with an aqueous alkaline leach liquor containing ore body impurities and copper cyanide anions, at least some of which have a double negative valence, a water-insoluble, oil-soluble extractant selected from the group consisting of quaternary ammonium salts and phosphonium salts having 4 carbon chain substituents per molecule, with each substituent having not greater than 12 carbon atoms and the sum of the number of carbon atoms of the 4 substituents being at least 18, dissolved in a water-immiscible organic solvent selected from the group consisting of petroleum fractions and monocyclic aromatic fractions and mixtures thereof, extracting the copper as a cyanide complex into the said solvent, separating the solvent, stripping the copper from said solvent with an aqueous alkaline metal cyanide stripping solution, recycling the stripped solvent to the extracting step, adding a soluble sulfide in a stoichiometric sufficiency, and an acid to return the pH below about 5, separating the copper as a sulfide from the solution, and recycling the cyanide remaining in the solution.

6. The process of claim 5 in which the extractant is tricaprylmethyl ammonium chloride and the organic solvent is kerosene.

References Cited

UNITED STATES PATENTS

| 3,056,648 | 10/1962 | Childers et al. | 75—117 |
| 3,001,868 | 9/1961 | Aveston et al. | 75—119 |
| 3,215,524 | 11/1965 | Fetscher et al. | 75—117 |

L. DEWAYNE RUTLEDGE, *Primary Examiner.*

T. R. FRYE, *Assistant Examiner.*

U.S. Cl. X.R.

75—105, 106; 23—55

UNITED STATES PATENT OFFICE

CERTIFICATE OF CORRECTION

Patent No. 3,429,694 February 25, 1969

George William Lower

It is certified that error appears in the above identified patent and that said Letters Patent are hereby corrected as shown below:

Column 2, line 29, "amendable" should read -- amenable --; line 30, "tested" should read -- treated --; line 59, "sulfied" should read -- sulfide --. Column 4, line 66, "headily" should read -- readily --. Column 6, line 29, "appliaction" should read -- application --. Column 7, line 46, "conduced" should read -- conducted --; line 50, "chalococite" should read -- chalcocite --; line 57, "comibned" should read -- combined --. Column 8, line 60, "liquids" should read -- liquors --.

Signed and sealed this 7th day of April 1970.

(SEAL)
Attest:

Edward M. Fletcher, Jr.
Attesting Officer

WILLIAM E. SCHUYLER, JR.
Commissioner of Patents